UNITED STATES PATENT OFFICE.

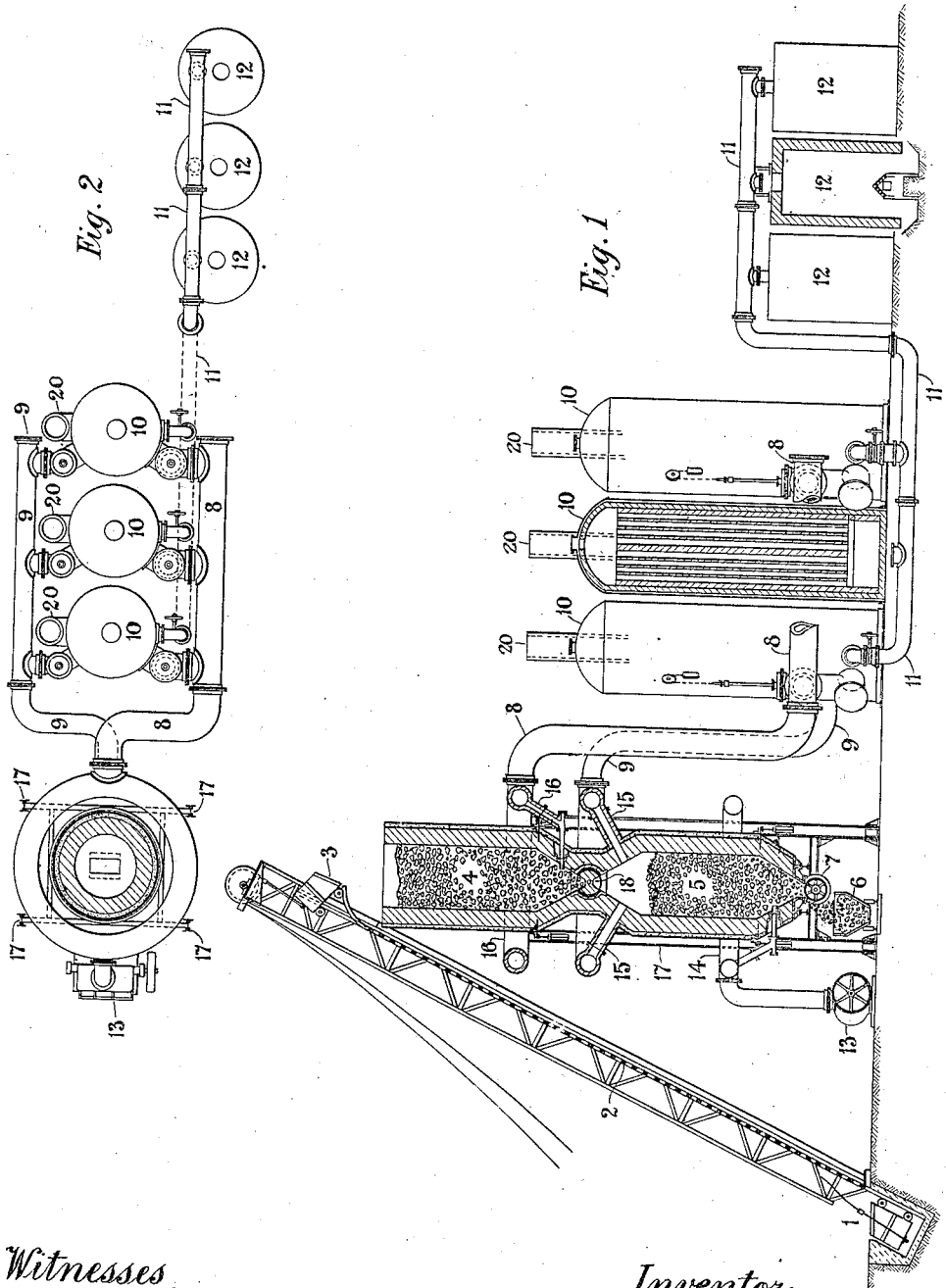

ARTHUR J. MOXHAM, OF WILMINGTON, DELAWARE.

PROCESS OF GRAVITY LIQUID SEPARATION OF IRON ORES.

1,203,897. Specification of Letters Patent. Patented Nov. 7, 1916.

Application filed March 25, 1914. Serial No. 827,074.

*To all whom it may concern:*

Be it known that I, ARTHUR J. MOXHAM, a subject of the King of Great Britain, residing at Wilmington, county of New Castle, and State of Delaware, have invented a new and useful Improvement in Processes of Gravity Liquid Separation of Iron Ores, of which the following is a full, clear, and exact description, reference being had to the accompanying drawings, which form a part of this specification.

To concentrate iron ore and reduce the percentage of silicious material or gangue, it has been proposed to take ore containing in its natural state combined water, organic matter or any other reducing agent, and also containing a much higher percentage of silicious material than is advantageous for use in the blast furnace, and subject the same to ordinary calcination for the purpose of driving off the combined water or other matter capable of being driven off by heating. This increases the specific gravity of the oxid of iron while the specific gravity of the silicious material is not increased. Anything increasing the difference between the specific gravity of the constituents of the ore that it is desired to separate acts advantageously in the process of separation.

The process is conducted as follows: The ore is subjected to the action of a liquid having a great specific gravity, such as haloid salts, for instance, antimony bromid, specific gravity 3.65 at .94° C. or tin bromid, specific gravity 3.30 at 28° C., or acetylene bromid, specific gravity 2.98 at ordinary temperatures. At the above temperatures the haloid salt is liquid. The specific gravity of these salts is such that the richer and, therefore, heavier portion of the ore sinks while the silicious material floats and the necessary separation is thus effected.

In the practice of the foregoing process it has been ascertained that calcination as ordinarily conducted has a reducing action upon the oxygen existing in the iron ore and that portion of the iron ore which is reduced reacts with the heavy specific gravity solution when such solution consists of haloid salts such as antimony or tin bromid and with many others thereby causing a loss of the same. As the heavy specific gravity solutions are expensive, even a minute loss is to be avoided. In the ordinary calcining operation the products of combustion usually come into contact with the oxid of iron of the ore and as they carry an excess of carbonaceous material, *e. g.*, carbonic acid mixed with carbonic oxid, they act to reduce or partially deoxidize the ore.

The object of my invention is to so practice the foregoing process that the presence of any reducing gases such as those used for heating of the ore may be avoided or neutralized. This I accomplish by substituting for the ordinary method of calcination a method which is neutral and which avoids the danger of reducing the oxid of the iron.

The following operations are examples: First: If I heat the ore by direct contact with the products of combustion I mix with these products of combustion so large an excess of the air that the gases as a whole in their admixed condition carry an excess of oxygen whereby the products of combustion will be neutral so far as the ore is concerned. Second. I avoid contact between any of the products of combustion and the ore. In either of these two methods of effecting neutral calcination the reduction of the oxids in the ore is avoided and consequently there is no reduced oxid of iron to react with the solution and therefore no loss of the solution. The first of these two methods can be practised by first securing an initial heat in the products of combustion greater than would be otherwise needed and then admixing therewith a large excess of air. There should be more than enough air to permit of the oxygen neutralizing any free carbon or combination thereof or any other reducing agent present, both in the products of combustion and in the ore. In this case the ordinary rotary kiln can be made to answer with the necessary appliances for the delivery and admixture of the surplus air.

In the second case I carry out the process in the following manner:

In the drawing: Figure 1 is a side elevation partly in section, and Fig. 2 is a plan of the apparatus.

1 and 3 are ordinary skip trucks; 2 the frame work of the ordinary form of skip hoist; 4 the heating chamber of a stationary kiln; 5 the cooling chamber of the same; 6 the car for removal of the calcined ore; 7 cylindrical delivery gate for continuously delivering the ore; 8 the hot blast main whereby the heated air is delivered into the heat chamber 4 by means of twyers or nozzles 16; 9 the main for delivery of the air into the regenerators 10, 10, 10, the middle one of which is shown in section; 11 the gas main which delivers from the gas producers 12, 12, 12, the gas for heating the regenerators; 20 the outlet stacks from the regenerators for carrying off the gas after it has heated the generators; 17 the columns which carry the stationary kiln; 13 a pump or blower for delivery of the air.

I have ascertained that a pressure of a few ounces will suffice to deliver air in ordinary volume through iron ore crushed say to ¼ inch cube or thereabout.

The method of operation is the following: Ore having been delivered by means of the skip hoist into the upper heating chamber 4 of the stationary kiln and one or more of the regenerators having been properly heated by means of the producer gas, the gas connection to one of the said regenerators is cut off and the air connection is opened. The blower 13 will then drive the air through the cooling chamber 5 of the rotary kiln and thence, by means of the air ducts 15, 15, and the air main 9, into the highly heated regenerative chamber. The air in its passage through said regenerative chamber absorbs the heat and carries said heat by means of the hot air main 8 into and through the ore in the heating chamber 4. The temperature of the regenerator will be from 2,000° F. to 3,000° F., hence the air at the point of entry into the heat chamber 4 rapidly heats up the ore. The capacity of this heat chamber and the volume of ore in proportion to the volume and pressure of the air delivered are so adjusted that whereas a temperature as high as it can go without starting to fuse the ore will be maintained at the lower point of the heating chamber, a temperature as low as say 300° F. or thereabout will be maintained at the point of exit. Thus the temperature at the point of exit, while sufficient to maintain in the form of steam the combined water that is being driven off in the heating chamber, is no higher. This now comparatively cooled air carries the steam off into the atmosphere. By means of the rotating delivery gate 18 the hot ore from the bottom of the heat chamber 4, from which the combined water has been driven, is continuously being delivered into the cooling chamber 5. At the lower portion of this chamber it meets the cool air delivered by the blower 13 on its way to the regenerator, and being cooled by said air the ore leaves the cooling chamber at a low temperature, say from 100° F., to 200° F. or thereabout. The air used for cooling this ore, which is now partially heated, is then carried through the regenerative chamber and, as before described, utilized as the means of carrying the heat from said chamber to the heat chamber 4. It is known that ore in a static or immovable condition, as in the device we illustrate, picks up extraneous heat very slowly because the various particles of ore are not fully in contact with each other. In most cases they touch each other only in points and there is therefore insufficient conducting medium for the heat to pass through the mass. It is therefore necessary to carry the heat into and through the ore by a means that will make it surround and act on each individual particle. It will be noted that the main province of the air, therefore, is that of a carrier. In the cooling chamber it picks up heat from the ore and carries it into the regenerator. In the regenerator it gathers more heat and carries this accumulated heat into and through the ore in the heating chamber. After giving up its heat to the ore, it picks up the steam thereby driven off from the water present in the ore and carries this out into the atmosphere. When the heat has been exhausted from the regenerative chamber first in use, the air is cut off from this regenerative chamber and this chamber is once more put into communication with the gas producer and reheated by the combustion of the gas from same. The partially heated air passing through the air main 9 is then put through the second regenerative chamber which is now hot, and so the work is carried on in a continuous cycle.

It will be noted that whereas the air carrying the steam or other products developed by heating the ore passes out into the atmosphere at a relatively low temperature at one end, the ore leaves the calcining kiln at a relatively low temperature at the other end; and thus great economy in the use of the heat is secured. Again, it is known that the efficiency of combustion is greater when the combustion is completed at a high heat than when it is effected at a low heat, and by the use of regenerators in connection with the method of transferring the heat by air, we can heat the regenerators to a much higher temperature than would otherwise be possible, and we thereby secure this greater efficiency. Moreover, the air, which is the carrier of the heat, being entirely free from any reducing agency, the ore passes through the kiln in an absolutely neutral condition and without any reduction of the oxid of the same, because of the neutalizing or oxidizing tendency of the air. It is also possible to use a rotary kiln heated entirely from the outside and with a balanced interior pressure effected by keeping a seal of ore both at the receiving and the delivery ends of the kiln. As long as the heat is kept uniform no change in the pressure or tension of the contained air occurs and there is, therefore, so slight a tendency for the outside atmosphere to interfere in the process that a very little friction introduced against the passage of the outside atmosphere will suffice to keep it out. An ordinary amount of ore in the feed and delivery points will effect this. If a positive division between the outside and inside air be deemed best, it can be readily obtained by mechanical means, e. g., by letting the ore pass through a rotary gate such as is shown in the drawing Fig. 1 and marked 18.

While I more particularly contemplate the employment, as separating liquids, of haloid salts, and any other liquids that may be available which are of higher specific gravity than that of the lighter constituents of the ore, my invention is not confined to a process which necessarily involves the employment of such a liquid; it being understood that the process may be practised to substantial advantage if the separation is effected, by jig impulse, in a liquid of lower specific gravity than that of the lighter constituents of the ore, in a manner known in the art.

Having now fully described my invention, what I claim and desire to protect by Letters Patent is:

1. The hereinbefore described process of concentrating those iron ores which are adapted to be changed in composition by heat, which consists in calcining the ore without reduction of the oxid therein, and then subjecting the ore to a gravity separating action in a liquid containing one or more ingredients decomposable by reduced ore.

2. The hereinbefore described process of concentrating those iron ores which are adapted to be changed in composition by heat, which consists in heating the ore while avoiding contact therewith of gases capable of deoxidizing the ore, and then subjecting the ore to a gravity separating action in a liquid containing one or more ingredients decomposable by reduced ore.

3. The hereinbefore described process of concentrating those iron ores which are adapted to be changed in composition by heat, which consists in subjecting the ore to neutral calcination and then subjecting the calcined ore to a gravity separating action in a liquid containing one or more ingredients decomposable by reduced ore.

4. The hereinbefore described process of concentrating those iron ores which are adapted to be changed in composition by heat, which consists in subjecting the ore to neutral calcination and then subjecting the calcined ore to a gravity separating action in a liquid heavier than water and containing one or more ingredients decomposable by reduced ore.

5. The hereinbefore described process of concentrating those iron ores which are adapted to be changed in composition by heat, which consists in subjecting the ore to neutral calcination and then subjecting the calcined ore to a gravity separating action in a liquid of a specific gravity substantially higher than that of the silicious constituent of the ore and containing one or more ingredients decomposable by reduced ore.

In testimony of which invention, I have hereunto set my hand, at Wilmington, Del., on this 23rd day of March, 1914.

ARTHUR J. MOXHAM.

Witnesses:
C. E. SPENCE,
CHARLES D. HARTMAN, Jr.